United States Patent [19]

Shinoi et al.

[11] 4,341,927
[45] Jul. 27, 1982

[54] DATA TRANSMISSION APPARATUS

[75] Inventors: Tsuyoshi Shinoi, Yokohamashi; Fumikazu Hamatani, Kawasakishi, both of Japan

[73] Assignees: TIE/Communications, Inc., Shelton, Conn.; Nippon Tsushin Kogyo K.K., Kawasaki, Japan

[21] Appl. No.: 176,734

[22] Filed: Aug. 11, 1980

Related U.S. Application Data

[63] Continuation of Ser. No. 7,899, Jan. 30, 1979, abandoned.

[30] Foreign Application Priority Data

May 2, 1978 [JP] Japan .................................. 53-52269

[51] Int. Cl.$^3$ .......................................... H04L 25/00
[52] U.S. Cl. .................................. 179/2 DP; 375/36; 178/63 R
[58] Field of Search .................... 179/2 R, 2 DP, 3, 4, 179/84 R, 81 R; 178/63 R, 69 R; 375/36

[56] References Cited

U.S. PATENT DOCUMENTS 3,671,671  6/1972  Watanabe .............................. 375/36

Primary Examiner—Joseph A. Popek
Attorney, Agent, or Firm—Francis N. Carten

[57] ABSTRACT

Signal data is generated by interconnected non-inverting and inverting voltage followers and is transmitted on power-carrying conductors to a remote detection circuit comprising a differential amplifier which receives equal in-phase signal inputs of opposite polarity, thereby effecting cancellation of any externally-induced noise which might accompany the signal data.

8 Claims, 4 Drawing Figures

DATA TRANSMISSION APPARATUS

This is a continuation of application Ser. No. 007,899, filed Jan. 30, 1979, now abandoned.

BACKGROUND OF THE INVENTION

The present invention is related to telephone terminal equipment. More specifically, this invention is a method and apparatus for the transmission of digital data of relatively low frequency between the common equipment and the station equipment in a telephone system installation, and for the detection of such digital data.

Known circuit arrangements for data transmission between a key service unit (KSU) and key telephone station sets employ a conductor pair separate from the power supply conductors. Techniques for super-imposing digital data signals on the power supply conductors are also known, but suffer from the disadvantage of noise induced by external sources.

It is the object of the present invention to enable the transmission and reception of digital data signals on the same conductor pair employed to transfer power from a key service unit to the station sets in a key telephone system without the disadvantages of prior art circuits.

SUMMARY OF THE INVENTION

The present invention is embodied in and carried out by a signal data generation and detection system which is electrically connected to a power transmission circuit but is unaffected by fluctuations in the parameters of the power transmission circuit or by noise induced therein.

BRIEF DESCRIPTION OF THE DRAWING

The present invention may be better understood by reading the written description thereof with reference to the accompanying drawings, of which.

DESCRIPTION OF THE PREFERRED EMBODIMENT

Figure 1:
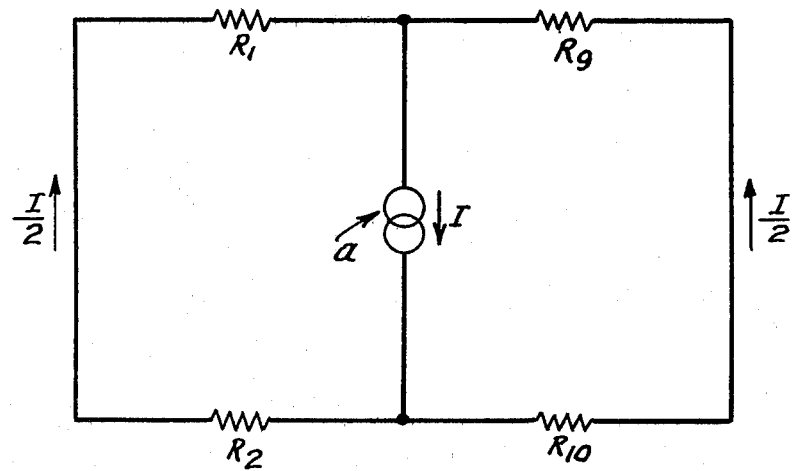
FIG. 1 is a simplified circuit diagram illustrating the principle of signal transmission by means of current modulation.

Referring specifically to FIG. 1, constant current source a has two parallel branches connected across its terminals, the first branch being formed by series-connected resistances $R_1$ and $R_2$ and the second branch being formed by series-connected resistances $R_9$ and $R_{10}$, all of the aforementioned resistances being of equal value. When the current generated by source a is varied from O to I by any method whatever, and when the current flowing through resistances $R_1$ and $R_2$ is designated as $i_1$ and the current flowing through resistances $R_9$ and $R_{10}$ is designated as $i_2$, then the following equations define the relationship of those currents and resistances:

$$i_1 + i_2 = I \quad (1)$$

$$(R_1 + R_2)i_1 = (R_9 + R_{10})i_2 \quad (2)$$

Because all of the resistances are of equal value, the following equation is derived:

$$i_1 = i_2 = I/2 \quad (3)$$

Consequently, when current I is varied in any way, e.g., by pulse modulation, the currents $i_1$ and $i_2$ flowing in the branches formed by resistances $R_1$ and $R_2$ and resistances $R_9$ and $R_{10}$, respectively, are similarly varied. Thus, by detecting the branch currents $i_1$ and $i_2$, signals imposed upon current I may be derived.

Figure 2:
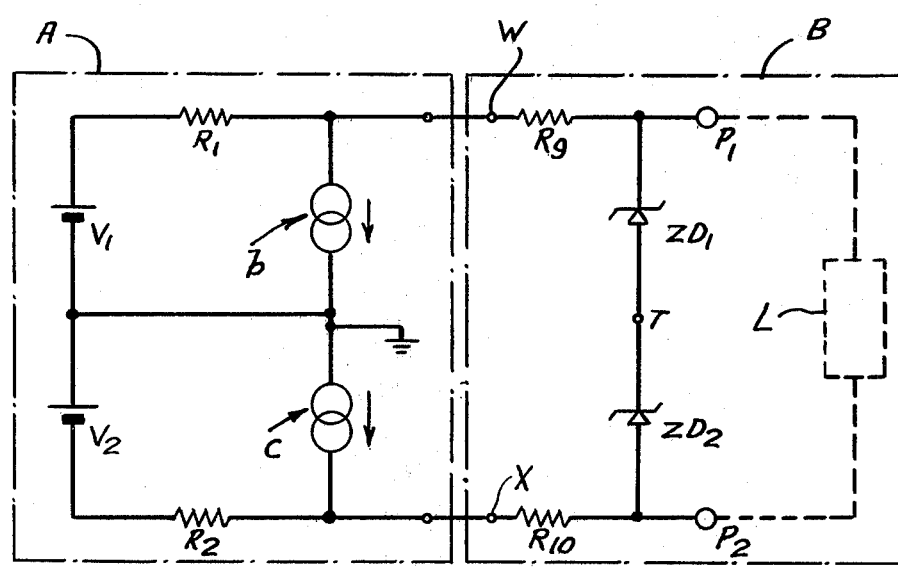
FIG. 2 is a simplified circuit diagram illustrating current modulation signal transmission and power transmission on the same conductor pair.

Referring specifically to FIG. 2, circuit A is situated in the common equipment, e.g., a key service unit, and circuit B is situated in the station equipment, e.g., a key telephone station set. In circuit A, constant current sources b and c generate currents of equal values. $V_1$ and $V_2$ are sources of electromotive forces of equal value, and together they provide power to load L in circuit B. Zener diodes $ZD_1$ and $ZD_2$ regulate the voltage applied to load L. Although the value of load L may fluctuate, causing the current flowing through load L to vary, as long as the voltage impressed across the zener diodes $ZD_1$ and $ZD_2$ exceeds their breakdown voltage, the impedances of cells $V_1$ and $V_2$ and of zener diodes $ZD_1$ and $ZD_2$ will be low enough to have no effect on the current flowing in constant current sources b and c. Thus, the power transmission components of FIG. 2 may be disregarded when analyzing this system from the standpoint of signal transmission, thereby reducing the system to the circuit of FIG. 1 for this purpose. Consequently, when the constant currents of sources b and c are employed as carriers for signals which cause those currents to vary from their normal constant level, there will be corresponding variations in the current flowing through resistances $R_9$ and $R_{10}$, which will in turn cause variations in the potential differences between points T and W and between points T and X in circuit B. Thus, the signals transmitted from circuit A may be detected at circuit B by detecting the voltage drop between points T and W or points T and X.

Figure 3:
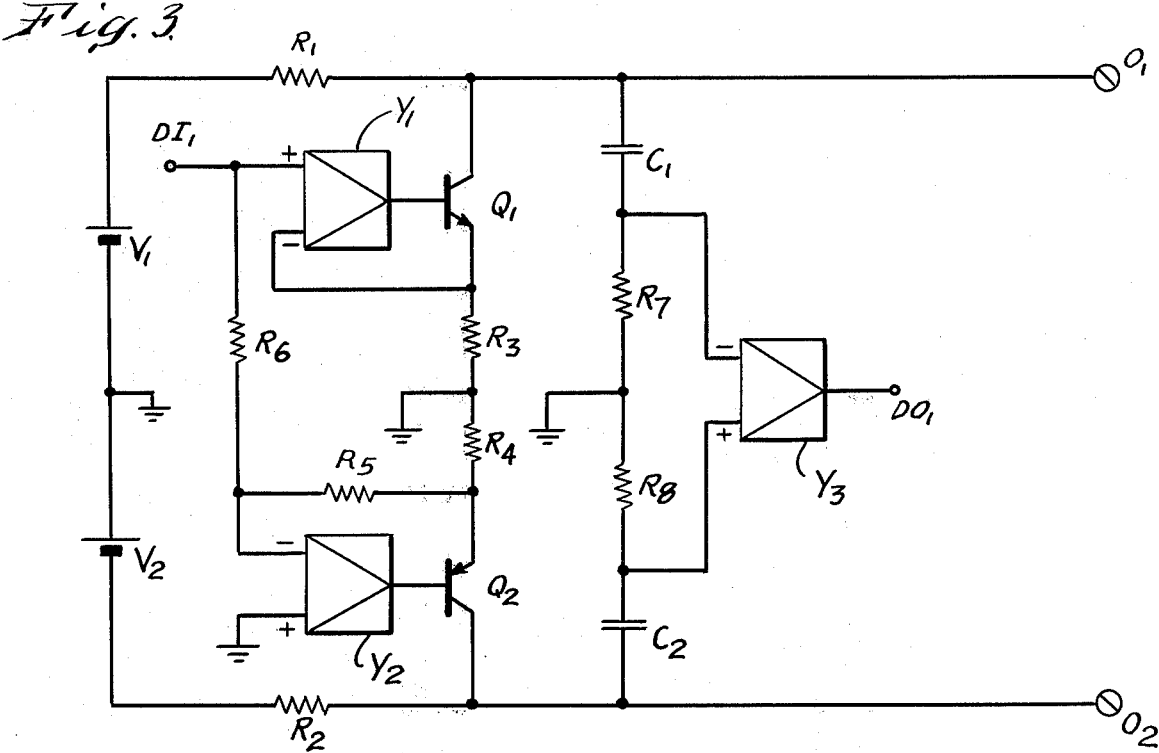
FIG. 3 is a schematic circuit diagram of a signal generating and detecting circuit utilized in the key service unit of an electronic key telephone system.
Figure 4:
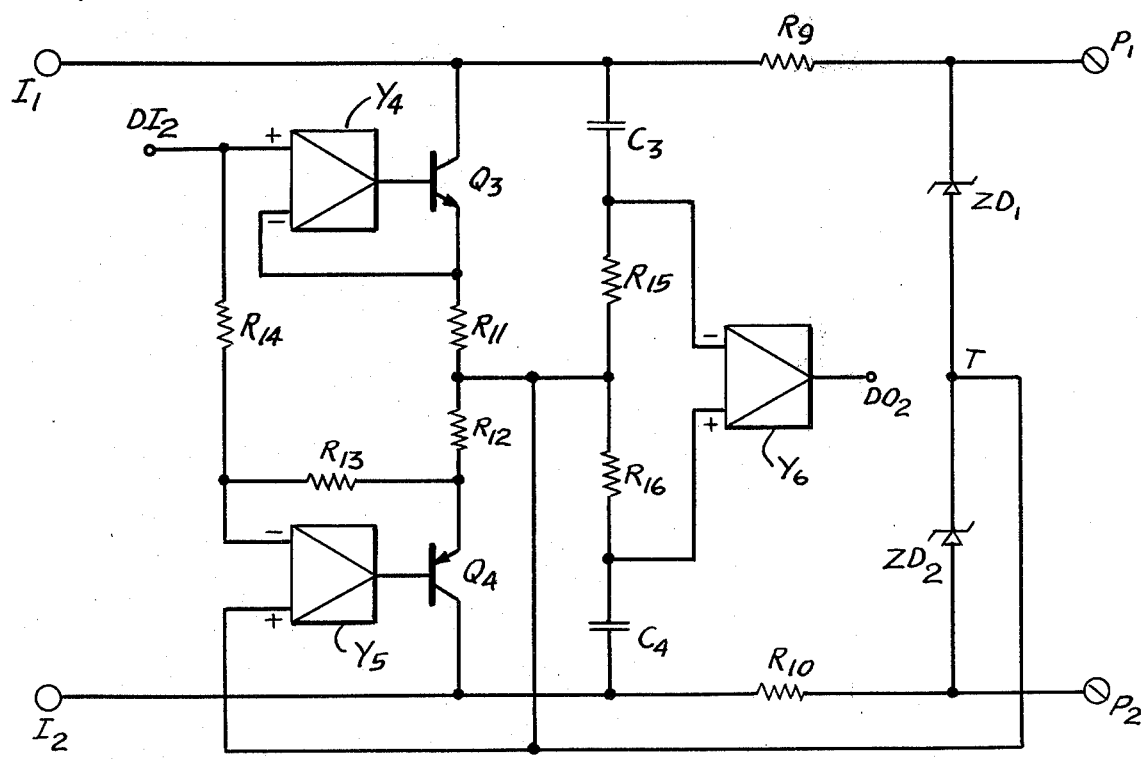
FIG. 4 is a schematic circuit diagram of a signal generating and detecting circuit utilized in the station sets of an electronic key telephone system.

Referring specifically to FIGS. 3 and 4, the circuits shown in these drawings correspond to circuits A and B, respectively, in FIG. 2. In FIG. 3, a first constant-current source (b) is formed by non-inverting differential amplifier $Y_1$, the NPN-type transistor $Q_1$ and resistance $R_3$. A second constant-current source (c) is formed by inverting differential amplifier $Y_2$, the PNP-type transistor $Q_2$, and resistances $R_4$ $R_5$ and $R_6$. A first voltage follower circuit is formed by $Y_1$ and $Q_1$, and a second voltage follower circuit is formed by $Y_2$ and $Q_2$. By making the resistance $R_5$ and $R_6$ equal, the gain of $Y_2$ is unity, a necessary condition for the second voltage follower circuit. Any potential difference impressed between data input terminal $DI_1$, and ground will result in a voltage of equal magnitude and opposite polarity between the emitter of $Q_2$ and ground, and a voltage of equal magnitude and same polarity between the emitter of $Q_1$ and ground. Thus, by making the values of resistances $R_3$ and $R_4$ equal, the currents flowing through $Q_1$ and $Q_2$ are made equal. The variations in these currents cause variations in the voltage drops across resistances $R_1$ and $R_2$, and those variations in voltage drops form the signal output across terminals $O_1$ and $O_2$.

In the station equipment circuit shown in FIG. 4, the differential amplifier $Y_6$ with resistances $R_{15}$ and $R_{16}$ and capacitances $C_3$ and $C_4$ form a signal detection circuit which reproduces at data output terminal $DO_2$ the signals applied to data input terminal $DI_1$ in FIG. 3. To the high-frequency components of the signal voltage pulses appearing across terminals $I_1$ and $I_2$, the impedances of $C_3$ and $C_4$ appear low in comparison to the values of $R_{15}$ and $R_{16}$. In this circuit, $R_{15}$ and $R_{16}$ are of equal value, and $C_3$ and $C_4$ are of equal value. In the system, terminals $O_1$ and $O_2$ of FIG. 3 are connected to terminals $I_1$ and $I_2$, respectively, of FIG. 4. When a voltage change is effected at data input terminal $DI_1$, a current I will flow in $Q_1$ and $Q_2$. As illustrated in FIGS. 1 and 2, a current I/2 will flow from terminal $I_2$ through $R_{10}$ and $R_9$ to terminal $I_1$, thereby generating a voltage change of $-IR_9/2$ between terminal $I_1$ and the junction T of $ZD_1$ and $ZD_2$, and a voltage change of $+IR_{10}/2$ between terminal $I_2$ and the junction T of $ZD_1$ and $ZD_2$. Given that differential amplifier $Y_6$ has a gain of $A_0$, then the resulting output at data output terminal $DO_2$ will be:

$$A_0[(IR_{10}/2)-(-IR_9/2)]$$

or $$A_0I(R_9+R_{10})/2$$

The signals appearing at data output terminal $DO_2$ are fed to processing circuitry for decoding and generating of control signals.

In the station circuit of FIG. 4, the junction T serves as an effective ground point corresponding to the actual ground in the central or common circuit of FIG. 3, and thus T may be regarded as being connected to the ground in the circuit of FIG. 3. With the identical input circuits $C_3$, $R_{15}$ and $C_4$, $R_{16}$ of differential amplifier $Y_6$ being connected to this effective ground point T at the junction of $R_{15}$ and $R_{16}$, it will be seen that noise induced in the conductors running from terminals $O_1$ and $O_2$ to terminals $I_1$ and $I_2$, respectively, will be cancelled because of in-phase appearance at both input terminals of differential amplifier $Y_6$, and therefore will not appear at data output terminal $DO_2$.

The circuit of FIG. 4 includes a signal generating circuit ($Y_4$, $Q_3$, $Y_5$, $Q_4$, $R_{11}$, $R_{12}$, $R_{13}$, $R_{14}$) which is identical in construction and operation to the signal generating circuit in the circuit of FIG. 3, which has been described above. The circuit of FIG. 3 includes a signal detection circuit ($Y_3$, $C_1$, $C_2$, $R_7$, $R_8$) which is identical in construction and operation to the signal detection circuit in the station circuit of FIG. 4, which has been described above. Therefore, further explanation of these duplicate circuits is deemed unnecessary.

The advantages of the present invention, as well as certain changes and modifications to the disclosed embodiment thereof, will be readily apparent to those skilled in the art. It is the applicants' intention to cover all those changes and modifications which could be made to the embodiment of the invention herein chosen for the purposes of the disclosure without departing from the spirit and scope of the invention.

We claim:

1. A data transmitting and receiving system, comprising:
    (1) data signal generating circuit means operative to generate data signals and having output terminals connected between first and second power-carrying conductors at a first power transmitting site, comprising:
        (a) a non-inverting voltage follower circuit means having first and second input terminals and first and second output terminals; and
        (b) an inverting voltage follower circuit means having first and second input terminals and first and second output terminals, said second output terminals being connected to a common ground and said first output terminals being connected to said first and second power-carrying conductors at said site, said first input terminals being connected through input network means in said inverting voltage follower circuit means; and
    (2) data signal detection circuit means connected between said first and second power-carrying conductors at a second power receiving site at which a variable load is connected across said power carrying conductors, and operative to receive each of said data signals as two inputs of equal magnitude and opposite polarity and, in response thereto, to generate data signals corresponding to the data signals generated by said data signal generating circuit means.

2. The system according to claim 1, wherein said non-inverting voltage follower circuit means comprises:
    (1) a differential amplifier, the input terminals of which correspond to said first and second input terminals;
    (2) a transistor having its base connected to the output of said differential amplifier; and
    (3) a resistance connected in series with the collector-emitter junction of said transistor.

3. The system according to claim 1, wherein said inverting voltage follower circuit means comprises:
    (1) a differential amplifier, the input terminals of which correspond to said first and second input terminals;
    (2) a transistor having its base connected to the output of said differential amplifier;
    (3) a resistance connected in series with the collector-emitter junction of said transistor;
    (4) a resistance connected between the emitter of said transistor and said first input terminal; and
    (5) a resistance connected between said first input terminals of said non-inverting and inverting voltage follower circuit means.

4. The system according to claim 1, wherein said data signal detection circuit means comprises:
    (1) a differential amplifier having first and second input terminals;
    (2) first input circuit means connected between said first power-carrying conductor and an effective ground, and to said first input terminal of said differential amplifier; and
    (3) second input circuit means connected between said second power-carrying conductor and said effective ground, and to said second input terminal of said differential amplifier.

5. The system according to claim 4, wherein first and second zener diodes are connected in series and are both poled for conduction in the same direction between said first and second power conductors, said effective ground being provided at the junction of said first and second zener diodes.

6. The system according to claim 4, wherein said first input circuit comprises a first capacitance and a first resistance connected in series from said first power-carrying conductor to said effective ground, and said second input circuit comprises a second capacitance and a second resistance connected in series from said second power-carrying conductor to said effective ground.

7. The system according to claim 6, wherein said first and second capacitances are of equal value and said first and second resistances are of equal value.

8. The system according to claim 6, wherein said first input terminal of said differential amplifier is connected to the junction of said first capacitance and said first resistance, and said second input terminal of said differential amplifier is connected to the junction of said second capacitance and said second resistance.

* * * * *